Oct. 16, 1934.                H. C. MOORMAN                1,977,346
               AUTOMATIC NONFREEZABLE LIVE STOCK WATERER
                  Filed Oct. 20, 1933        2 Sheets-Sheet 1
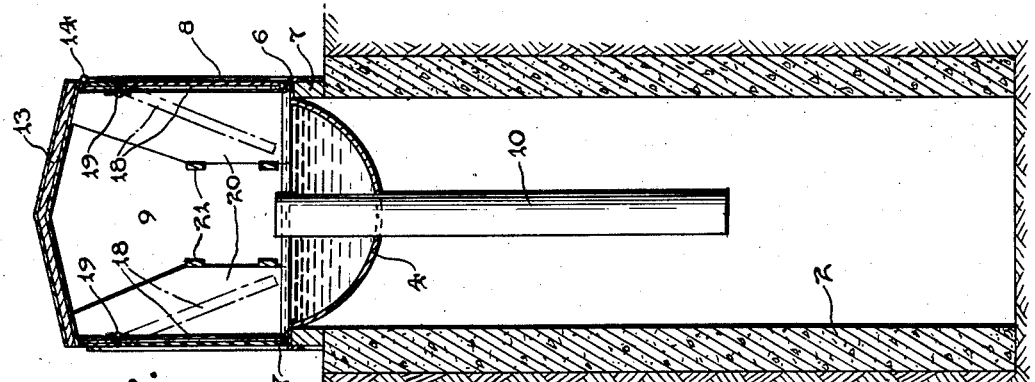
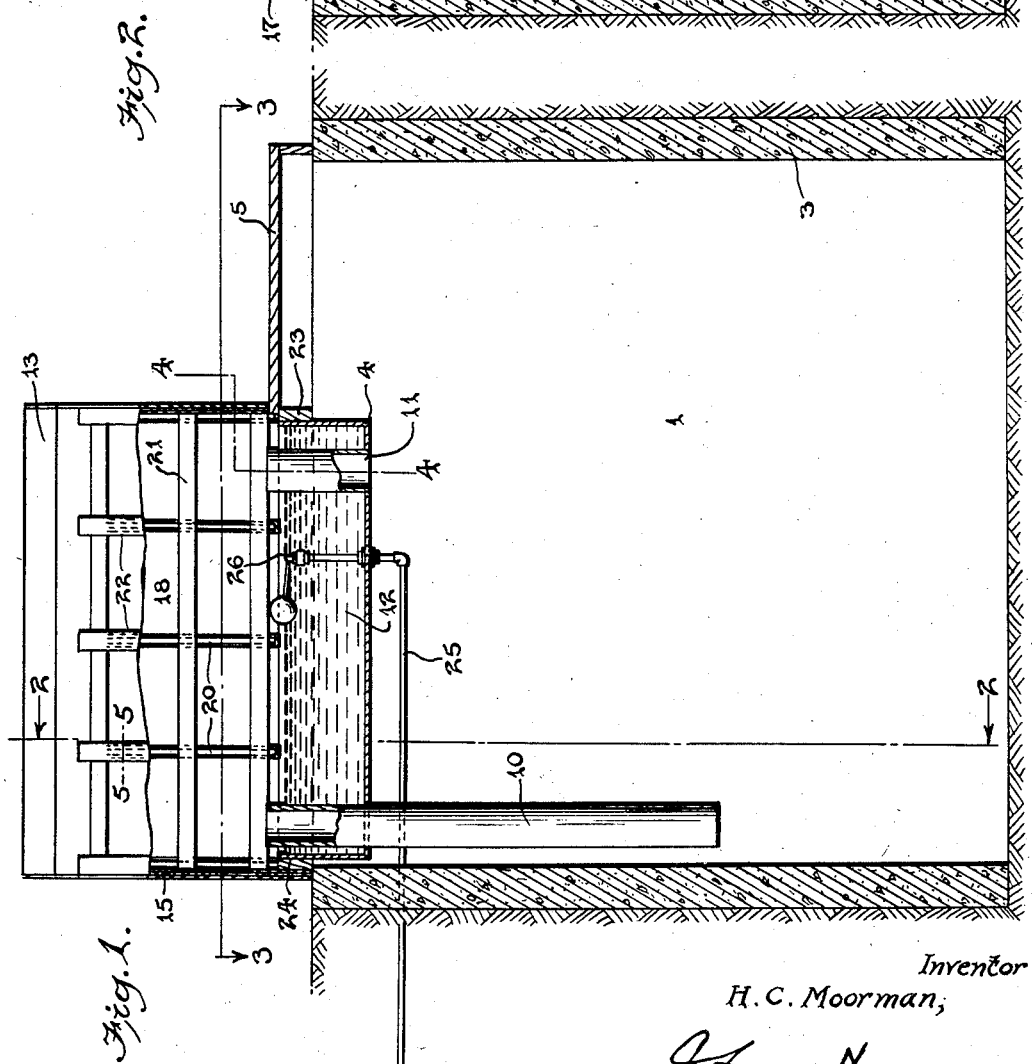
Inventor
H. C. Moorman,
By
Attorney Oct. 16, 1934.   H. C. MOORMAN   1,977,346
AUTOMATIC NONFREEZABLE LIVE STOCK WATERER
Filed Oct. 20, 1933   2 Sheets-Sheet 2
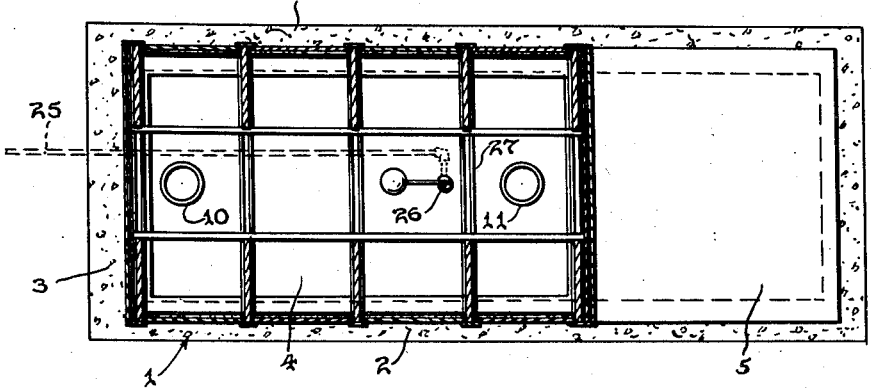
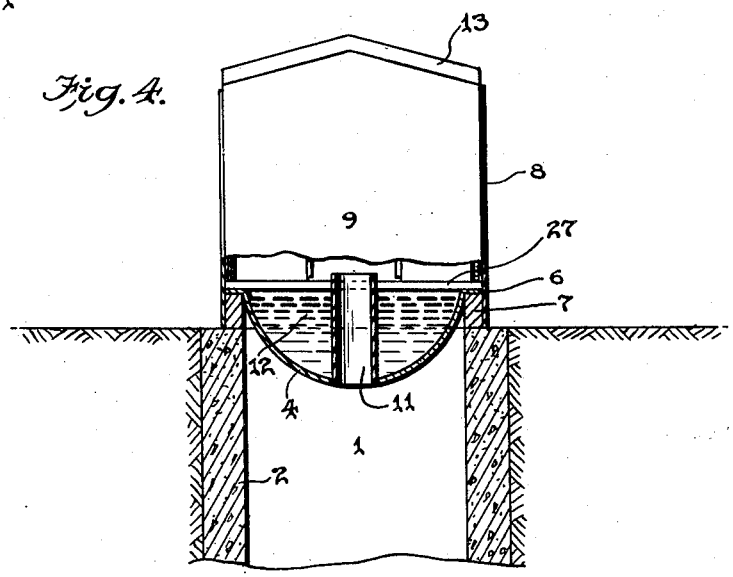
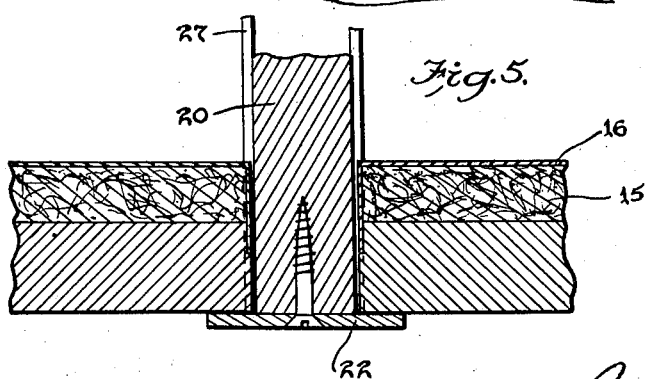
Inventor
H.C. Moorman,
By
Attorney Patented Oct. 16, 1934

1,977,346

UNITED STATES PATENT OFFICE 1,977,346

AUTOMATIC NONFREEZABLE LIVE STOCK WATERER

Hamilton C. Moorman, Sumner, Ill.

Application October 20, 1933, Serial No. 694,494

8 Claims. (Cl. 119—73)

The invention relates to an automatic non-freezable live stock waterer.

The object of the present invention is to improve the construction of live stock waterers and to provide a simple, practical and efficient live stock waterer of strong, durable and comparatively inexpensive construction adapted to insure a supply of fresh water at all times in a perfectly sanitary condition to hogs and other animals, and capable of preventing the water from freezing without the use of artificial heat, thereby eliminating fire hazard and the labor incident to the attention required where artificial heating means is employed for preventing the water from freezing.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1 is a longitudinal sectional view of an automatic non-freezable live stock waterer constructed in accordance with this invention.

Fig. 2 is a transverse sectional view on the line 2—2 of Fig. 1.

Fig. 3 is a horizontal sectional view on the line 3—3 of Fig. 1.

Fig. 4 is a transverse sectional view partly in elevation, taken on the line 4—4 of Fig. 1.

Fig. 5 is a detail horizontal sectional view on the line 5—5 of Fig. 1.

In the drawings in which is illustrated the preferred embodiment of the invention, the automatic non-freezable live stock waterer comprises in its construction a relatively deep pit 1 forming a lower air chamber and provided with side and end walls 2 and 3 of concrete or other suitable material. The bottom of the pit is preferably earth and the pit is designed to be of a depth of six feet, but the dimensions of the pit may be varied as will be readily understood. The pit forms a relatively large air chamber which by extending a considerable distance below the level of the ground and below the point where the ground freezes in winter is adapted to supply relatively hot air at a temperature sufficiently above the freezing point of water in a drinking trough 4 to prevent the water from freezing, whereby a continuous supply of water will be supplied to hogs and other live stock at all times without requiring artificial heat to prevent the water in the drinking trough 4 from freezing.

The drinking trough 4 which may be of any preferred form, is preferably semi-cylindrical and is preferably constructed of heavy sheet metal, but any other suitable material may, of course, be employed in the construction of the drinking trough. The drinking trough covers a portion of the pit so that the lower exterior surface of the drinking trough is directly exposed to the effect of the air within the lower air chamber 1. The pit is extended beyond one end of the drinking trough to insure a relatively large lower air chamber and the extension of the pit is covered by a platform 5 of wood or any other suitable material.

The drinking trough is preferably provided at its side edges with horizontal outwardly extending flanges 6 which are arranged upon sills 7 mounted upon the side walls 2 of the pit, but the drinking trough may be mounted over the pit in any other suitable manner, as will be readily understood.

The drinking trough is covered by a housing 8 which extends above the drinking trough and forms an upper air chamber 9 which communicates with the lower air chamber by means of pasages formed by vertical pipes 10 and 11 passing through the bottom of the drinking trough and extending a short distance, preferably two inches above the level of the water 12 within the drinking trough. The pipes 10 and 11 are preferably four inches in diameter and constructed of cast iron, but they may be varied in size and may be constructed of any other suitable material. The lower end of the pipe 11 terminates at the upper portion of the pit while the pipe 10 extends downwardly through the upper portion of the pit and terminates at the lower portion, preferably at a lower point than midway between the top and bottom of the pit, but the pipe 10 may be varied in length to secure the desired differential in the temperature of the air at the lower end of the pipe 10 and the lower end of the pipe 11 to cause a positive circulation of air through the air passages formed by the pipes 10 and 11 and through the upper and lower air chambers, whereby air will be circulated around and through the drinking trough at a temperature above the freezing point of water.

This will effectually prevent the water in the drinking trough from freezing in the coldest weather and will insure a continuous supply of water at all times to the live stock. Also this will avoid the necessity of employing artificial heat for preventing the water from freezing and will eliminate the fire hazard incident to the employment of such artificial heat to prevent the water from freezing. It will also eliminate the labor incident to the attention required by such artificial heating means.

The housing 8 is preferably constructed of wood and consists of side and end walls and a top or roof 13 which may be a gable roof, as illustrated in the accompanying drawings, or any other type of roof and the roof is preferably connected with one of the side walls by hinges 14 to enable the roof to operate as a lid or cover for affording ready acess to the interior of the live stock waterer. The walls and top of the housing are preferably provided with insulating material 15 which may be of any desired construction and which is preferably retained in place by a sheet 16 of suitable material.

The side walls of the housing are provided with door openings 17 and automatically closable doors 18 are connected by hinges 19 at their tops to the housing at the tops of the door openings so that the doors will close by gravity. The doors are arranged to swing inwardly and may be readily moved inwardly by hogs and other animals to enable the same to obtain access to the water within the drinking trough.

The housing is also provided with inwardly extending partitions 20 located at the sides of the door openings and between the door openings and one end of the housing and the said partitions 20 are spaced apart at their inner edges and preferably connected at their inner edges by longitudinal tie bars 21. The partitions 20 are supported at their lower edges by transverse bars 27 extending across the trough and arranged in pairs and located at both faces of the partitions 20, as clearly illustrated in Fig. 3 of the drawings. The inner edges of the partitions are spaced apart to enable the upper air chamber to extend the entire length of the drinking trough and the housing. The said partitions divide the housing at opposite sides into drinking compartments which permit the animals to drink without permitting them to foul the water within the drinking trough. The outward swing of the doors 18 is limited by stop strips 22 preferably constructed of metal and secured to the partitions at the outer edges thereof and extending laterally beyond the outer edges of the partitions and arranged in overlapping relation with respect to the doors when the latter are closed, as clearly illustrated in Fig. 5 of the drawings.

The housing is supported by the longitudinal sills 7 and also by transverse sills 23 and 24 which extend across the pit. The transverse sill 23 also preferably supports the inner end of the platform 5 which covers the extended portion of the pit.

The water is supplied to the drinking trough by a supply pipe 25 preferably located beneath the surface of the ground, as clearly illustrated in Fig. 1 of the drawings, and extending to a suitable source of supply. The flow of water to the drinking trough is regulated by a float-controlled controlled valves for this purpose are clearly understood, further description thereof or detailed illustration of the same is deemed unnecessary. As the water is consumed in the trough the water is automatically supplied to the drinking trough by the float-controlled valve.

What is claimed is:

1. A non-freezable live stock waterer including a pit forming a lower air chamber, a drinking trough arranged over the pit and having its lower exterior surface exposed directly to the air in the said chamber, a housing covering the trough and forming an upper air chamber, and air passages connecting the upper and lower air chambers and arranged to produce around the trough a continuous circulation of air at a temperature higher than the freezing point of water, whereby water in the trough will be prevented from freezing without the employment of artificial heat.

2. A non-freezable live stock waterer including a pit forming a lower air chamber, a drinking trough arranged over the pit and having its lower exterior surface exposed directly to the air in the said chamber, a housing covering the trough and forming an upper air chamber, and air passages extending through the trough and connecting the upper and lower air chambers and arranged to produce around the trough a continuous circulation of air at a temperature higher than the freezing point of water, whereby water in the trough will be prevented from freezing without the employment of artificial heat.

3. An automatic non-freezable live stock waterer including a pit forming a lower air chamber, a drinking trough arranged over the pit and having its lower exterior surface directly exposed to the air within said chamber, automatically operable means for supplying water to the drinking trough, a housing covering the drinking trough and forming an upper air chamber, said housing having automatically closeable doors for affording access to the drinking trough, and air passages connecting the upper and lower air chambers and arranged to produce around the trough a continuous circulation of air at a temperature above that of the freezing point of water whereby the water in the drinking trough will be prevented from freezing without the use of artificial heat and a continuous supply of fresh water will be afforded live stock at all times.

4. A non-freezable live stock waterer including a pit forming a lower air chamber, a drinking trough arranged over the pit and having its lower exterior surface exposed directly to the air within the said chamber, a housing covering the drinking trough and forming an upper air chamber, and pipes passing through the bottom of the drinking trough and extending above the level of the water within the drinking trough and arranged to produce a continuous circulation of air to and from the upper and lower air chambers whereby air at a temperature above the freezing point of water will be circulated around the drinking trough and water within the same will be prevented from freezing without the use of artificial heat.

5. A non-freezable live stock waterer including a pit forming a lower air chamber, a drinking trough arranged over the pit and having its lower exterior surface exposed directly to the air within said chamber, a housing covering the drinking trough and forming an upper air chamber, said housing being provided at opposite sides with door openings, partitions extending inwardly from the sides of the door openings and forming separate drinking compartments and spaced at their inner edges from one another, longitudinal tie bars connecting the partitions at the inner edges thereof, transverse bars extending across the trough and connected to and separating the partitions at the lower edges thereof, doors located at and normally closing the door openings, and passages connecting the upper and lower air chambers and arranged to produce a continuous circulation of air around the drinking trough for causing air to pass back and forth from one air chamber to the other whereby water in the drinking trough is prevented from freezing without the use of artificial heat.

6. A non-freezable live stock waterer including a pit forming a lower air chamber, a drinking trough arranged over the pit, the latter being of greater length than the trough to form an extension of the pit at one end of the trough, a housing covering the trough and forming an upper air chamber, a platform extending from the housing and covering the extension of the pit, and pipes passing through the bottom of the drinking trough and extending above the water level thereof and having their lower ends terminating at different elevations in the pit whereby the differential in temperatures of the air at the lower ends of the pipes will cause the circulation of air through the pipes and the upper and lower air chambers to prevent freezing of water within the drinking trough.

7. A non-freezable stock waterer including a pit having side and end walls and forming a lower air chamber, a trough supported by the walls of the pit and extending over the same and having its lower exterior surface exposed directly to the air in the air chamber, a housing supported by the walls of the pit and covering the drinking trough and forming an upper air chamber, and pipes of unequal length passing through the bottom of the trough and extending above the water level of the drinking trough, one of the pipes extending below the plane of the lower end of the other pipe whereby the differential in temperature of the air at the lower ends of the pipes will cause a circulation of air through the pipes and through the upper and lower air chambers to prevent freezing of water within the drinking trough.

8. A non-freezable live stock waterer including a pit forming a lower air chamber, a drinking trough arranged over the pit and having its lower exterior surface exposed directly to the air in said chamber, a housing covering the drinking trough and forming an upper air chamber above the drinking trough, said housing being provided with door openings and having closures for the same, transverse partitions extending from opposite sides of the door openings and forming separate drinking compartments and spaced at their inner edges from one another, stop strips mounted on the partitions at the outer edges thereof and extending laterally from the same to form stops for the said closures, and passages connecting the upper and lower air chambers and arranged to form a circulation of air around the drinking trough to prevent freezing of water therein.

HAMILTON C. MOORMAN.

CERTIFICATE OF CORRECTION.

Patent No. 1,977,346.                                October 16, 1934.

HAMILTON C. MOORMAN.

It is hereby certified that error appears in the printed specification of the above numbered patent requiring correction as follows: Page 2, line 17, for "acess" read access; and same page, after line 69, insert the words and syllable valve 26 of the ordinary construction and as float-; and that the said Letters Patent should be read with these corrections therein that the same may conform to the record of the case in the Patent Office.

Signed and sealed this 13th day of November, A. D. 1934.

Leslie Frazer
(Seal)                                Acting Commissioner of Patents.